(12) United States Patent  
Ray Avalani

(10) Patent No.: US 8,976,040 B2  
(45) Date of Patent: Mar. 10, 2015

(54) INTELLIGENT DRIVER ASSIST SYSTEM BASED ON MULTIMODAL SENSOR FUSION

(71) Applicant: Bianca Ray Avalani, Princeton, NJ (US)

(72) Inventor: Bianca Ray Avalani, Princeton, NJ (US)

( * ) Notice: Subject to any disclaimer, the term of this patent is extended or adjusted under 35 U.S.C. 154(b) by 62 days.

(21) Appl. No.: 13/768,979

(22) Filed: Feb. 15, 2013

(65) Prior Publication Data

US 2013/0222127 A1    Aug. 29, 2013

Related U.S. Application Data

(60) Provisional application No. 61/599,700, filed on Feb. 16, 2012.

(51) Int. Cl.

| | | |
|---|---|---|
| G08G 1/16 | (2006.01) | |
| B60Q 1/00 | (2006.01) | |
| B60Q 9/00 | (2006.01) | |
| G06K 9/62 | (2006.01) | |
| B60W 30/08 | (2012.01) | |
| G06K 9/00 | (2006.01) | |

(52) U.S. Cl.
CPC  *B60Q 1/00* (2013.01); *B60Q 9/008* (2013.01); *G08G 1/166* (2013.01); *G08G 1/167* (2013.01); *G06K 9/6293* (2013.01); *B60W 30/08* (2013.01); *B60W 2420/42* (2013.01); *B60W 2420/54* (2013.01); *B60W 2520/00* (2013.01); *G06K 9/00805* (2013.01); *G06K 9/00825* (2013.01)

USPC ........................... 340/903; 340/435; 348/148

(58) Field of Classification Search
USPC .......... 340/901, 903, 905, 435, 439; 348/148, 348/149
See application file for complete search history.

(56) References Cited

U.S. PATENT DOCUMENTS

| | | | | |
|---|---|---|---|---|
| 5,574,443 | A * | 11/1996 | Hsieh | 340/901 |
| 2005/0275520 | A1* | 12/2005 | Hijikata et al. | 340/466 |
| 2007/0132566 | A1* | 6/2007 | Yamazaki | 348/148 |
| 2010/0316255 | A1* | 12/2010 | Mathony et al. | 340/439 |
| 2012/0068858 | A1* | 3/2012 | Fredkin | 340/902 |

FOREIGN PATENT DOCUMENTS

JP    2002127948 A  *  5/2002

* cited by examiner

*Primary Examiner* — Thomas Mullen  
(74) *Attorney, Agent, or Firm* — Arent Fox LLP

(57) ABSTRACT

An apparatus and method of providing driver assistance for performing a driving action include obtaining video information adjacent to a vehicle, obtaining audio information adjacent to the vehicle, optionally obtaining movement-related information, and generating a driver assist indication based on a combination of the video information and the audio information, and, optionally, the movement-related information.

18 Claims, 17 Drawing Sheets

Decision Tree for Lane Change
(Horizontal patterned nodes to be processed by using audio and video sensors, and vertical patterned nodes by Accelerometer and gyroscope)

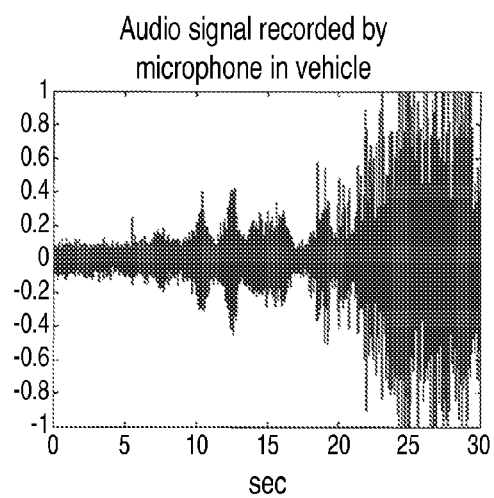 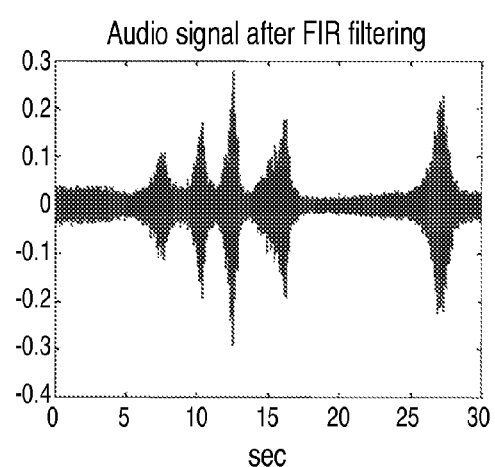
*FIG. 7A*  *FIG. 7B*

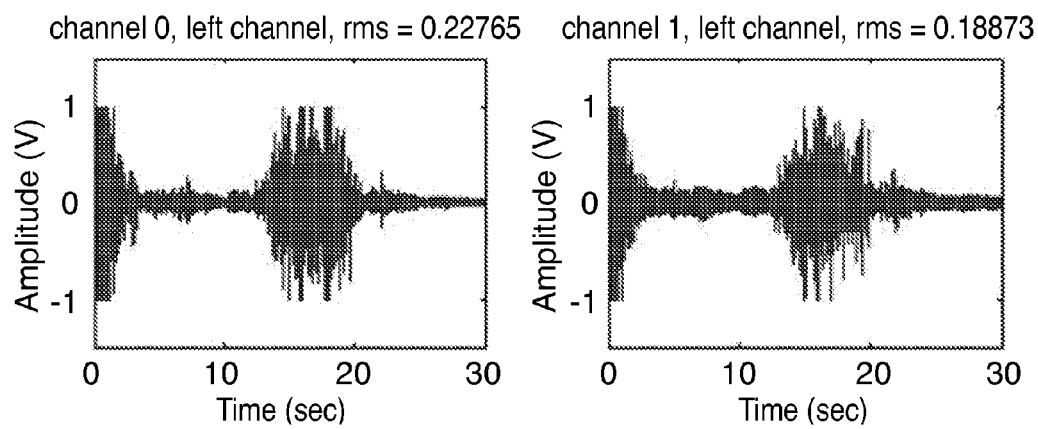
FIG. 12A — channel 0, left channel, rms = 0.22765
FIG. 12B — channel 1, left channel, rms = 0.18873
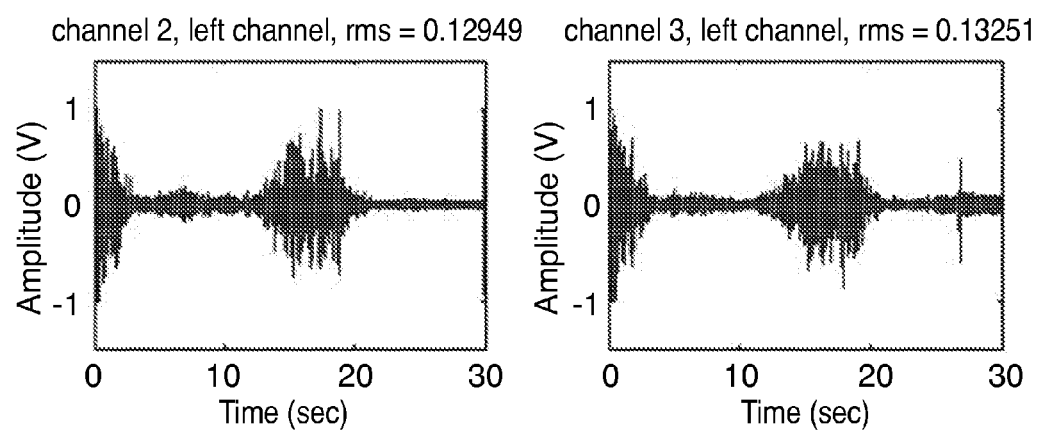
FIG. 12C — channel 2, left channel, rms = 0.12949
FIG. 12D — channel 3, left channel, rms = 0.13251

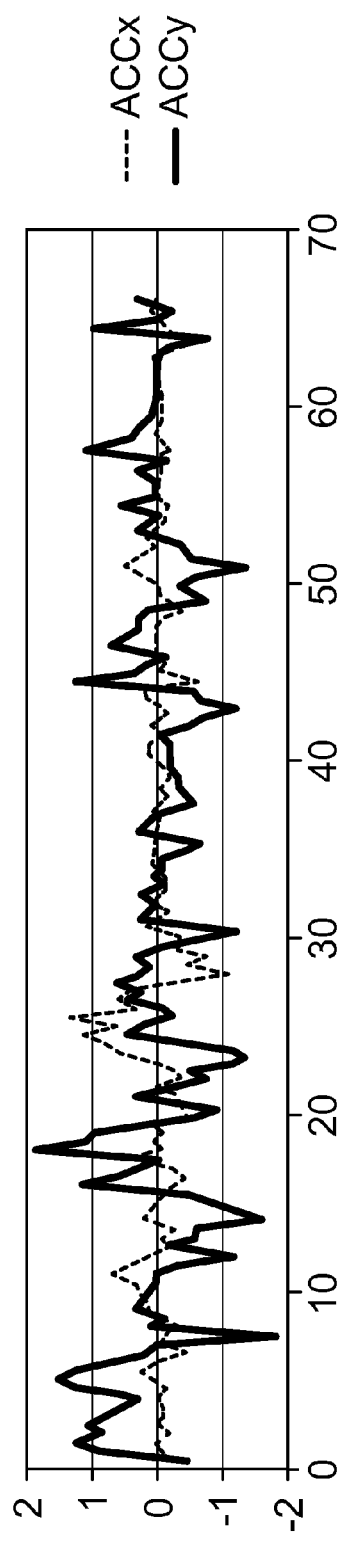
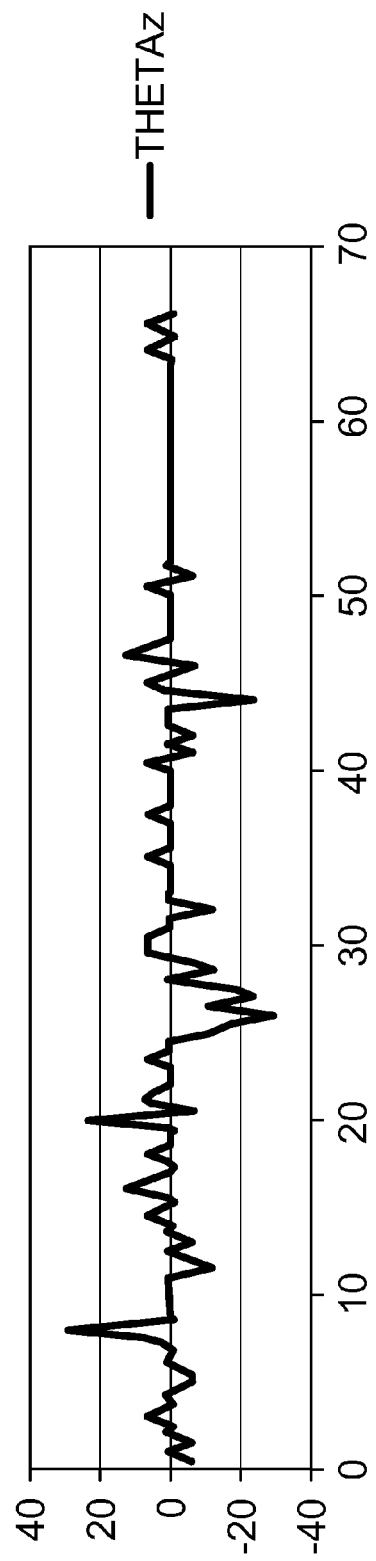
FIG. 13A
FIG. 13B

INTELLIGENT DRIVER ASSIST SYSTEM BASED ON MULTIMODAL SENSOR FUSION

CLAIM OF PRIORITY UNDER 35 U.S.C. §119

The present application for patent claims priority to Provisional Application No. 61/599,700 entitled "Intelligent Driver Assist System Based on Multimodal Sensor Fusion" filed Feb. 16, 2012, hereby expressly incorporated by reference herein.

BACKGROUND

According to the National Highway Traffic Safety Administration, car accident statistics in the US show that a large percentage of fatal crashes are caused by a driver's inability to make a correct split-second judgment while driving. This problem is even more serious for elderly drivers or those with disabilities, such as poor hearing, poor vision or poor reflexes. One of the goals of this research is to help these people drive safely, without giving up their own independence but also without endangering themselves or others.

Past research in the field of intelligent vehicles has been mostly related to:
  adaptive cruise control,
  collision-avoidance in the front and rear,
  lane departure warnings,
  parallel-parking assistance,
  blind spot monitoring, and
  autonomous vehicles (self-driven cars).

The majority of these systems rely on the presence of visible lane markers on the road, which are detected by using computer vision systems, GPS systems or digital maps for knowledge of the road's geometry, or ultrasonic sensors for sensing presence of obstacles in the front and rear of the car within a very short range. Heavy dependence on maps can sometimes make these systems vulnerable to unexpected objects on the streets, including fallen debris, road-blocks, children at play, cyclists, or cars that are broken down or stranded.

Another sensing modality uses short-range radar or LIDAR (Light Detection and Ranging) systems, which have been tested by scientists in various research labs to sense traffic up to a range of 200 meters. Some researchers have also suggested the use of Time-of-Flight cameras or 3D sensors such as MICROSOFT's XBOX KINECT, which uses infrared (IR) sensing. However, KINECT is quite deficient when used in open sunlight or outdoors with moving objects and surroundings. In addition, time-of-flight cameras have also not been shown to achieve the level of accuracy desired.

Many current projects are under development to provide drivers with assistance. Among these, lane-change-assist is an appealing idea to most drivers, because this is where they are most likely to make mistakes even when they are fully awake and driving in good road conditions. But this is a complex problem since it not only requires knowledge of the movement of cars in the next lane (including the blind zone) but also cars in the lane after that, any of which may suddenly decide to merge into the next lane with no warnings. It also requires knowledge of the approximate speed and acceleration of these cars, to avoid colliding with one which may approach at a high speed or decide to accelerate or decelerate to avoid other traffic.

Thus, improvements in driver assistance systems are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of method of providing driver assistance for performing a driving action, includes obtaining video information adjacent to a vehicle, obtaining audio information adjacent to the vehicle, optionally obtaining movement-related information, and generating a driver assist indication based on a combination of the video information and the audio information, and, optionally, the movement-related information.

In another aspect, a computer program product may including a computer-readable medium having instructions executable by a computer to perform the above-noted method.

In a further aspect, an apparatus for providing driver assistance for performing a driving action includes a video processor configured to obtain video information adjacent to a vehicle, an audio processor configured to obtain audio information adjacent to the vehicle, optionally a movement-related processor configured to obtain movement-related information, and a decision making processor configured to generate a driver assist indication based on a combination of the video information and the audio information, and, optionally, the movement-related information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIGS. 7A-7D are series of graphs of an aspect of a time domain analysis of recorded audio signals;

FIGS. 12A-12D are series of graphs of analysis of internal audio signals for source localization and tracking, e.g., with respect to a driver of a vehicle; and FIGS. 13A-13B are series of graphs of analysis of accelerometer and gyroscope data.

DETAILED DESCRIPTION

Various aspects are now described with reference to the drawings. In the following description, for purposes of explanation, numerous specific details are set forth in order to provide a thorough understanding of one or more aspects. It should be understood, however, that such aspect(s) may be practiced without these specific details.

The present apparatus and methods provide a driver assist indication to alert a driver with respect to a driving action based on analysis of data from a plurality of sensor arrays placed outside, and optionally, inside, of a vehicle. Although the following description provides an example of an apparatus and method of driver assistance relating to the process of changing lanes, it should be understood that the concepts and principles described herein may apply to any number of other driving actions. Moreover, the apparatus and methods described herein are configured to provide driver assistance irrespective of road conditions, outside lighting conditions, or volume of traffic. Additionally, in some aspects, the apparatus and methods described herein are configured to characterize motion of a driver's vehicle, as well as that of other vehicles in its proximity.

Figure 1A:
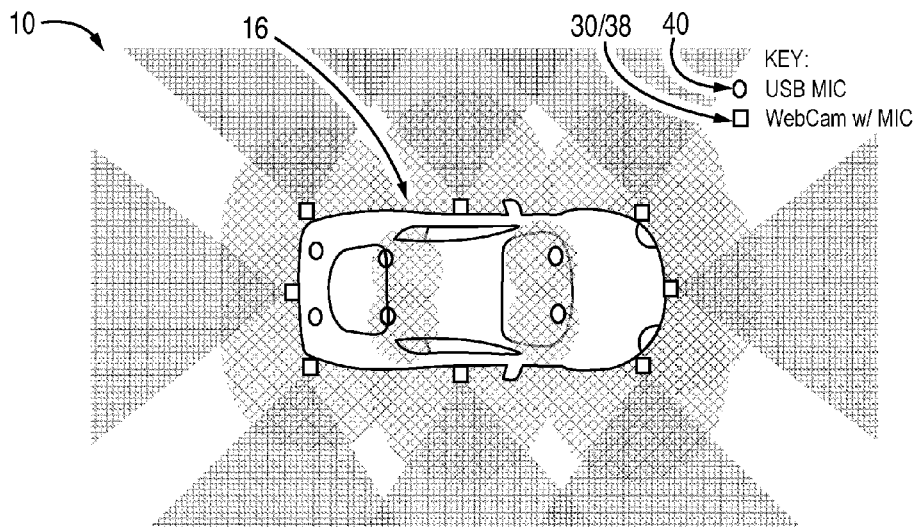
FIG. 1A is a schematic diagram of an aspect of a driver assist system.
Figure 1B:
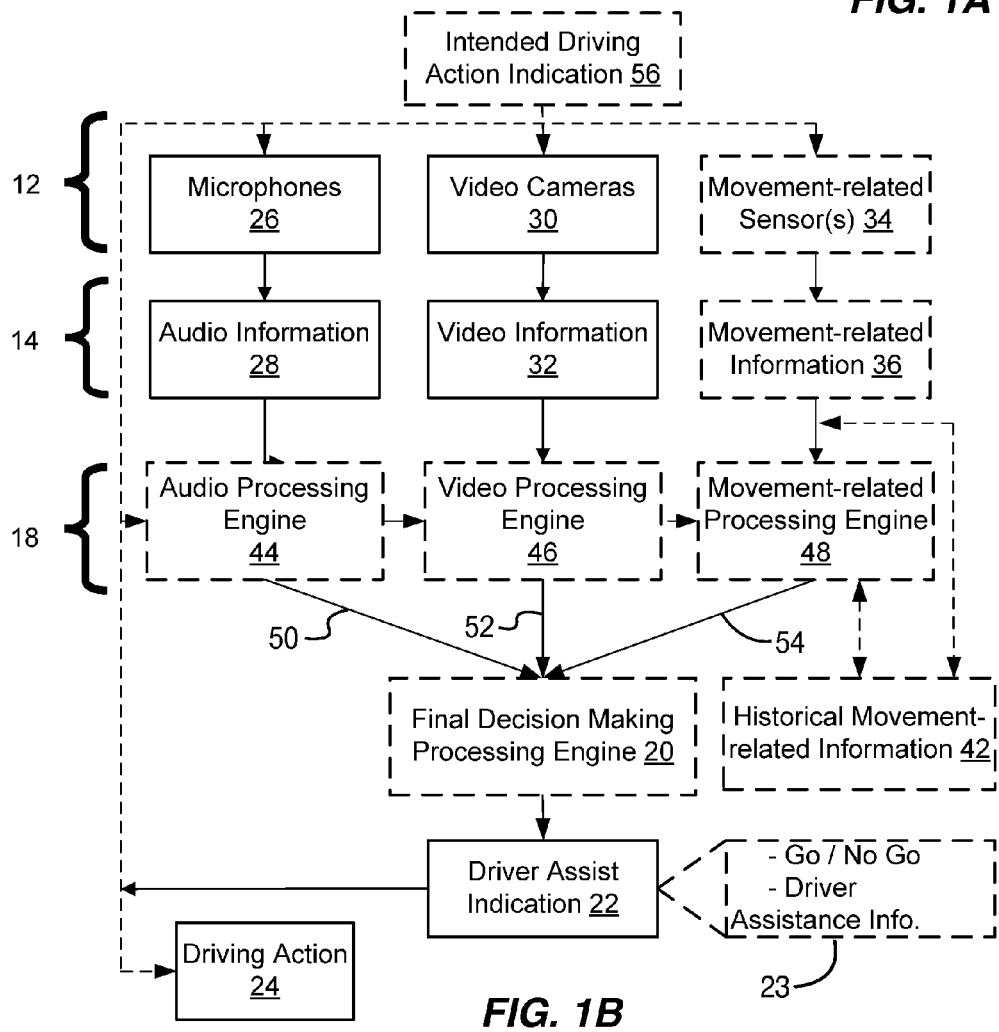
FIG. 1B is a flowchart of an aspect of a driver assist system.

Referring to FIG. 1, a driver assistance system 10 includes a plurality of multimodal sensor arrays 12 for collecting data 14 characterizing a vehicle 16 as well as about an area and/or other object(s)/vehicle(s) adjacent to vehicle 16. Further, driver assistance system 10 includes one or more multi-modal processing engines 18 for analyzing data 14, and a final decision making processing engine 20 for generating a driver assist indication 22 for outputting to a driver of vehicle 16. Driver assist indication 22 may include, for example, one or any combination of an audible, visual, or haptic output, including a positive indication 23 (e.g., "go") to recommend performing a driving action 24, a negative indication 23 (e.g., "no go") to recommend not performing driving action 24, and/or driving action assistance information to assist the driver in performing driving action 24. Driving action 24 may include, but is not limited to, one or more of a lane change, an acceleration of the vehicle, a deceleration of the vehicle, a change of direction, or any other type of action that a driver of a vehicle can control.

In an aspect, the plurality of multi-modal sensory arrays 12 may include a plurality of microphones 26 for obtaining audio information 28, a plurality of video cameras 30 for obtaining video information 32, and, optionally, one or more movement-related sensors 34 for obtaining vehicle movement-related information 36.

For example, in an aspect, the plurality of microphones 26 may include a first array of microphones 38 mounted external to vehicle 16, about a perimeter of vehicle 16, for obtaining external audio information. For instance, first array of microphones 38 may be positioned along each side, e.g. near a respective front side and a respective rear side and optionally at a respective middle, as well as at a front end and at a back end of vehicle 16. In an aspect, the plurality of microphones 26 may be multi-directional microphones to collect audio data from different directions. Further, in an aspect, the plurality of microphones 26, and in particular first array of microphones 38 mounted external to vehicle 16, may include an external noise filter such as a porous foam or a soft, long-fibered fabric microphone wind sock, to reduce or avoid audio saturation by one or more of wind noise, engine noise, and/or road noise, which tends to occur at relatively high velocities. The plurality of cameras 30 may be mounted in a manner similar to first array of microphones 38. Such a configuration of first array of microphones 38 and the plurality of cameras 30 outside of vehicle 16 provides a respective audio coverage area and a video coverage area extending adjacent to vehicle 16. As such, the coverage of first array of microphones 38 and the plurality of cameras 30 vehicle 16 enables the obtained external audio portion of obtained audio information 28 and video information 32 to define, via sound and visually, a state of the areas adjacent to vehicle 16 in which the driver may want to move, depending on driver action 24. For example, as discussed below in more detail, the obtained audio information 28 and the obtained video information 32 may characterize adjacent objects, or portions thereof, such as an adjacent vehicle, thereby enabling driver assistance system 10 to identify a presence or an absence of another vehicle that may affect performance of driving action 24.

Optionally, the plurality of microphones 26 may include a second array of microphones 40 mounted inside of vehicle 16 for obtaining internal (relative to vehicle 16) audio information. For example, in an aspect, second array of microphones 40 may be positioned at a front left and right location and a rear left and right location, thereby enabling directional sensing of sounds within vehicle 16. For instance, in an aspect, the configuration of the second array of microphones 40 enables the internal audio portion of obtained audio information 28 to define, via sound, a state of the driver of vehicle 16, e.g. with respect to an attention of the driver for performing driving action 24.

Further, for example, one or more movement-related sensors 34 may include, but are not limited to, one or more of an accelerometer to collect vehicle acceleration-related data, a gyroscope to collect vehicle direction-related information and/or rotation-related information such as pitch, roll and yaw, and a speedometer to collect vehicle speed-related information. For instance, in an aspect, one or more movement-related sensors 34 collect movement-related information 36 to define, via vehicle movement, a state of the vehicle 16, e.g. to help define an ability of vehicle 16 to perform driving action 24 or to help evaluate whether or not it is safe for vehicle 16 to perform driving action 24. For example, in an aspect, raw and/or processed movement-related information 36 may be stored as historical movement-related information 42 to provide a historical context to any decisions based on movement-related information 36.

Additionally, in an aspect, the one or more multi-modal processing engines 18 may include an audio processing engine 44 for analyzing audio information 28, a video processing engine 46 for analyzing video information 32, and, optionally, a movement-related processing engine 48 for analyzing vehicle movement-related information 36. Each of each of audio processing engine 44, video processing engine 46, and movement-related processing engine 48 may be communicatively coupled, e.g. via a bus or other wired or wireless communication link, to a corresponding one of the plurality of multi-modal sensory arrays 12, as well as to one another and to final decision making processing engine 20. Further, for example, in an aspect, each of audio processing engine 44, video processing engine 46, movement-related processing engine 48, and final decision making processing engine 20 may include one or more processors, or different modules or portions of the same processor, specially configured to perform the analysis described herein.

For instance, in an aspect, audio processing engine 44 may include one or more audio processing algorithms, such as an external audio processing algorithm and optionally an internal audio processing algorithm, configured to receive audio information 28 from the plurality of microphones 26 and generate processed audio information or audio decision 50 for forwarding to final decision making processing engine 20.

For example, in an aspect, the one or more audio processing algorithms may include an external time domain audio algorithm for performing time domain analysis of the external portion of audio information 28. For instance, audio processing engine 44 may execute the external time domain audio algorithm to remove noise from audio information 28 and identify audio signal peaks that can identify an object, such as a vehicle, adjacent to vehicle 16 and provide processed audio information or audio decision 50.

In another aspect, for example, the one or more audio processing algorithms may include an external frequency domain audio algorithm for performing frequency domain analysis of the external portion of audio information 28. For instance, audio processing engine 44 may execute the external frequency domain audio algorithm to remove noise from audio information 28 and identify audio signal peaks that can identify an object, such as a vehicle, adjacent to vehicle 16 and provide processed audio information or audio decision 50.

Additionally, when execution of the external time domain algorithm, or the external frequency domain algorithm, or some combination of both, detects audio signals that can be interpreted as identifying a vehicle, e.g. based on detecting signal peaks or signal intensities, in a direction relative to vehicle 16 that may affect driving action 24, audio processing engine 44 may generate processed audio information 50 that identifies the signal peaks or an indicator of their existence, or that is an audio decision such as a "no go," where the processed audio information 50 is an audio information component for use by final decision making processing engine 20 in making driver assist indication 22.

In a further aspect, the one or more audio processing algorithms may include an audio source algorithm for analyzing the external portion and/or internal portion of audio information 28 to localize and/or track a directional source of audio information 28. For instance, audio processing engine 44 may execute the audio source algorithm to remove noise from audio information 28 and identify audio signal peaks that can identify an object, such as a vehicle, in a direction relative to vehicle 16. For example, the direction relative to vehicle 16 may be determined based on, for example, the location on vehicle 16 of the one of the plurality of microphones 26 providing the portion of audio information 28 in which the signal peaks are identified. Further, based on identified signal peaks, audio processing engine 44 may generate processed audio information 50 that identifies the location of the source of signal peaks or an indicator of their existence, or that is an audio decision such as a "no go," where the processed audio information 50 is an audio information component for use by final decision making processing engine 20 in making driver assist indication 22.

Also, in an aspect, video processing engine 46 may include one or more video processing algorithms configured to receive video information 32 from the plurality of cameras 30 and generate processed video information or video decision 52 for forwarding to final decision making processing engine 20. For example, an aspect of a video processing algorithm may estimate an object velocity from video information 32, cancel noise from video information 32 to define noise-canceled video information, extract features from the noise-canceled video information, and determine whether the extracted features identify a vehicle. As such, based on execution of the one or more video processing algorithms, video processing engine 46 generates and sends processed video information or video decision 52, e.g., the extracted features and/or an indicator of the presence of features that represent a vehicle, or a go/no go and/or an additional video information message, to final decision making processing engine 20.

Additionally, in an aspect, movement-related processing engine 48 may include one or more movement-related processing algorithms configured to receive vehicle movement-related information 36 from the one or more movement-related sensors 34 and generate processed movement information or movement decision 54 for forwarding to final decision making processing engine 20. For example, in an aspect, the one or more movement-related processing algorithms may include an acceleration algorithm to analyze linear acceleration data, such as in one or more axis, which may be received from an accelerometer. Further, in another aspect, the one or more movement-related processing algorithms may include an angular motion algorithm to analyze angular motion data, such as in one or more axis, which may be received from a gyroscope.

Additionally, in another aspect, the one or more movement-related processing algorithms may include a velocity algorithm to analyze velocity data, such as in one or more axis, which may be received from a speedometer of vehicle. Also, it should be noted that, in a further aspect, movement-related processing engine 48 may include one or more processors that each may be located within a respective movement-related sensor 34. For example, in an aspect, movement-related sensor 34 may be a mobile phone and/or a Global Positioning System (GPS) device that includes respective processors for generating acceleration and/or angular motion data, and/or processed movement information or movement decision 54. In any case, based on execution of the one or more movement-related processing algorithms, movement-related processing engine 48 generates and sends processed movement information or movement decision 54, e.g., the acceleration, angular, and/or velocity data, or a go/no go and/or an additional movement-related information message, to final decision making processing engine 20.

Further, in an aspect, final decision making processing engine 20 may include one or more decision algorithms configured to receive one or more of processed audio information or audio decision 50, processed video information or video decision 52, and/or processed movement information or movement decision 54, and generate driver assist indication 22. For example, in an aspect, the one or more decision algorithms may include separate algorithms for analyzing the different sets of information, e.g. such as comparing each received processed information or decision to a respective threshold, and/or to additional decision thresholds, and adjusting a value and/or content of driver assist indication 22 based on the comparison. In an aspect, each respective threshold may represent a value of the respective information corresponding to a presence or absence of a vehicle adjacent to vehicle 16, and/or a level of safety for performing driving action 24. For instance, in an aspect, final decision making processing engine 20 may execute an audio decision algorithm that identifies signal peak values in processed audio information and compares the peak values to a peak threshold that indicates whether or not the signal peak value indicates presence of a vehicle. Correspondingly, when the comparison results an indication that a vehicle is present, then final decision making processing engine 20 may generate driver assist indication 22 with a "no go" value to alert a driver not to perform driving action 24 due to the detected vehicle. In contrast, for example, when the comparison results in an indication that a vehicle is not present, then final decision making processing engine 20 may generate driver assist indication 22 with a "go" value to alert a driver that it is ok to perform driving action 24 due to a lack of a detected vehicle. Also, in either case, final decision making processing engine 20 may generate driver assist indication 22 that further includes other information, referred to as driver assistance information, which may include, but is not limited to other data that can be determined from the received information, such as a location and/or speed of an adjacent vehicle. Additionally, other separate decision algorithms may include a video decision algorithm and a movement-related decision algorithm, which may operate in a similar manner as the audio decision algorithm. It should be noted that, in some aspects, such as when processed audio information or audio decision 50 received from audio processing engine 44 is an audio decision, then audio processing engine 44 may execute all or a portion of audio decision algorithm described above. Similarly, the same principle applies when processed video information or video decision 52 received from video processing engine 46 is a video decision, or when processed movement-related information or movement-related decision 54 received from movement-related processing engine 48 is a movement-related decision.

Moreover, the one or more decision algorithms may include a final decision algorithm, which in an aspect may cause generation of driver assist indication 22 based on one decision, or based on a combination of decisions, from each of the separate decision algorithms, e.g. the audio decision algorithm, the video decision algorithm, and the movement-related decision algorithm. For instance, in an aspect, the final decision algorithm may only generate a positive value (e.g., "go") for driver assist indication 22 when a result of the execution of each of the separate decision algorithms, e.g. the audio decision algorithm, the video decision algorithm, and/or the movement-related decision algorithm, also provides a positive indication. Conversely, in an aspect, the final decision algorithm may generate a negative value (e.g., "no go") for driver assist indication 22 when a result of the execution of any one of the separate decision algorithms, e.g. the audio decision algorithm, the video decision algorithm, and/or the movement-related decision algorithm, provides a negative indication. Moreover, as indicated by arrows in FIG. 1, the processing of driver assist indication 22 may occur based on sequential processing and analysis of data 14, such that a first one of the processing engines, such as but not limited to, audio processing engine 44 processes audio information 28 and generates processed audio information or audio decision 50, which by itself or based on further analysis by final decision making processing engine 20 may result in a negative value of driver assist indication 22. In this case, negative value of driver assist indication 22 may be configured to halt any subsequent processing and/or analysis of further modes of data 14, such as video information 32 and/or movement-related information 36. In other aspects, final decision algorithm may generate a positive or negative value for driver assist indication 22 when some combination of the other separate decision algorithms provide a positive or negative result, e.g. based on weighting the different results, etc.

Additionally, in an optional aspect, the operation of driver assistance system 10 may be triggered by receipt of an intended driving action indication 56. For example, intended driving action indication 56 may include, but is not limited to, a signal received from a component of vehicle 16, such as a signal indicating: a turn signal has been activated, and the corresponding direction; an accelerator has been adjusted, and optionally the changed value; a brake has been adjusted, and optionally the changed value; a steering wheel has been adjusted, and optionally the changed value; and any other type of input that may provide a hint of an upcoming driving action 24.

Thus, driver assistance system 10 fuses a plurality of different modalities of sensors in order to evaluate whether or not other vehicles are adjacent to vehicle 16 and/or whether it is safe to perform driving action 24, and generates an output including driver assist indication 22 to alert a driver of vehicle 16 as to a recommendation as to whether or not driving action 24 should be performed.

Figure 2:
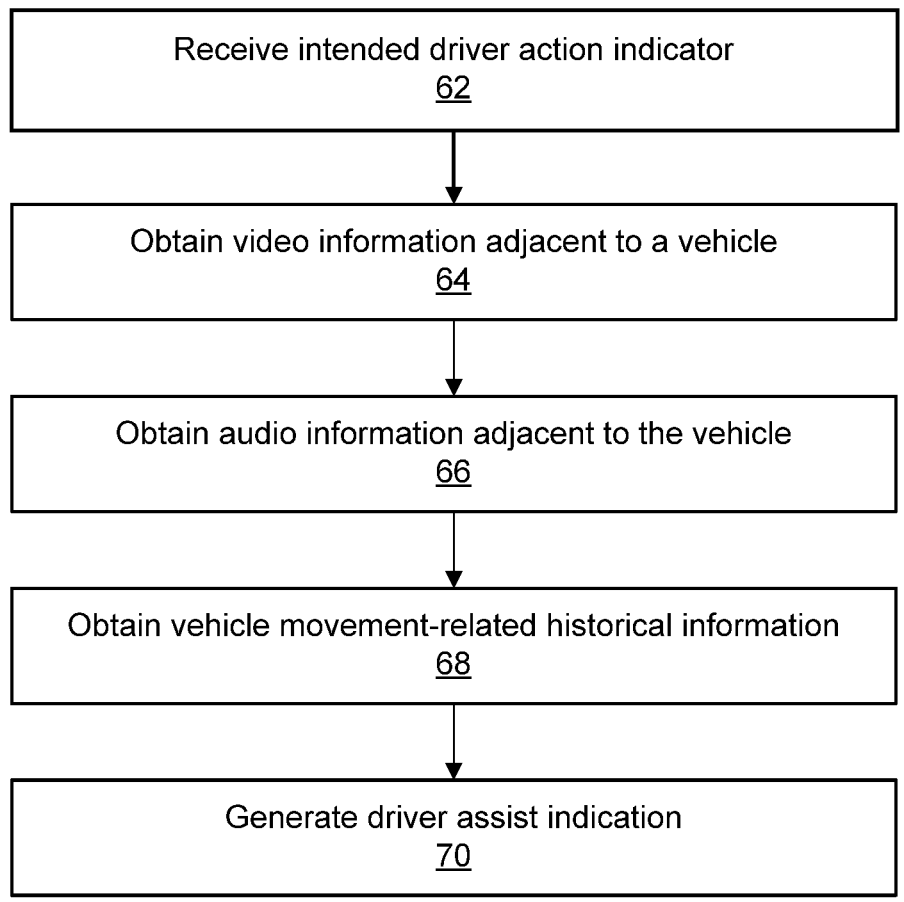
FIG. 2 is a flowchart of an aspect of a method of providing driving assistance.

Referring to FIG. 2, in operation, an aspect of a method 60 of providing driver assistance for performing a driving action may optionally include, at 62, receiving an intended driver action indication. For example, as described herein, driver assistance system 10 may be in wired or wireless communication with one or more components of vehicle 16, and may receive intended driver action indication 56 in response to activation of one such component, such as but not limited to a movement of a turning signal to indicate a turn or a lane change.

Further, at 64, method 60 may include obtaining video information adjacent to a vehicle. For example, as described herein, driver assistance system 10 and/or video processing engine 46 may obtain video information 32, such as from a plurality of video cameras 30.

Also, at 66, method 60 may include obtaining audio information adjacent to the vehicle. For example, as described herein, driver assistance system 10 and/or audio processing engine 44 may obtain audio information 28, such as from a plurality of microphones 26.

Optionally, at 68, method 60 may further include obtaining vehicle movement-related historical information. For example, as described herein, driver assistance system 10 and/or movement-related processing engine 46 may obtain movement-related information 36, such as from one or more movement-related sensors 34.

Additionally, at 70, method 60 may include generating a driver assist indication based on a combination of the video information, the audio information, and the vehicle movement-related historical information. For example, as described herein, mode-specific processing engines may process the mode-specific data and generate mode-specific processed data or mode-specific decisions, which are received and analyzed by final decision making processing engine 20 in order to generate driver assist indication 22, e.g. having a positive or negative value and/or including additional assistance information, for alerting a driver with respect to driving action 24.

For example, one use case will now be described. It should be understood that the following use case is an example of the operation of an aspect of driver assistance system 10 according to an aspect of method 60, but that other variations may likewise fall under the principles described herein. As such, this example should not be construed as being limiting.

Solution Framework

One aspect of this system is to save lives, which requires high degree of accuracy. To provide accurate alerts, e.g., driver assist indication 22, this system can monitor a number of parameters in real time, including road conditions (e.g., presence of obstacles on the road), the status of the driver's vehicle and the driver's physical condition, and that of the vehicle's surroundings.

Figure 3:
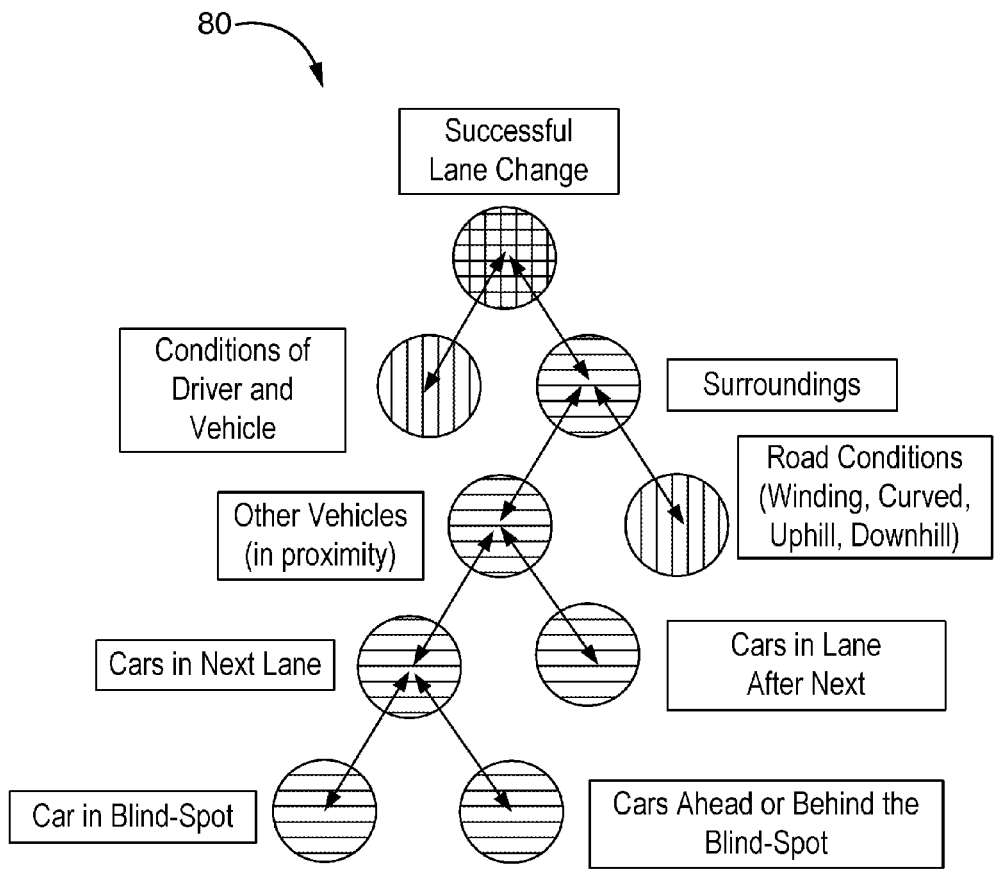
FIG. 3 is a decision tree, with sensing nodes, for an aspect of a lane change scenario, with some nodes representing audio and video sensing and other nodes representing accelerometer and gyroscope sensing.

Referring to FIG. 3, according to one aspect, a decision-tree for lane change includes the conditions that need to be monitored by this system, each represented as a node on this tree. Some of these nodes can be monitored by audio-video sensors and others by a combination of accelerometer and gyroscope.

Referring to the top portion of FIG. 1, a diversity of sensor types is also utilized, for example, to minimize chances of system error. Even though each sensor may have some limitations of its own, by combining different types of sensors, the individual limitations may be overcome. Further, the system includes an array of sensors, with overlapping coverage areas, to provide redundancy and improve the accuracy of vehicle detection. In this case, these sensors include an array of digital video cameras, preferably near infra-red cameras to allow for low light or foggy conditions, placed along the external periphery of the vehicle 16, a linear microphone array on each side of the vehicle 16 including both outside and inside the vehicle 16, a 3-axis accelerometer and a 1-axis gyroscope. In an aspect, this configuration leads to an outward-facing camera-microphone pair at each location outside the vehicle 16, and a total of 8 such sensor-pairs mounted on the external surface the vehicle 16.

System Configuration

The system uses multimodal sensors placed inside and outside vehicle 16 (Table 1) to gather data about it and its nearby vehicles. It then analyzes that data using both spatial and temporal feature extraction techniques. To make the system fail-safe, the system attempts to identify a number of features of an adjacent vehicle, not just one.

TABLE 1

Types of Sensors and their Locations

| Sensor Type | # of Sensors | Model No.: | Location |
| --- | --- | --- | --- |
| Video Cameras | 8 | Logitech C-910 | Outside the Vehicle |
| Stereo Microphone (with noise cancellation) | 8 | Logitech C-910 | Outside the Vehicle |
| USB Microphone | 4 | Marshall MX AC404 | Outside the Vehicle |
| USB Microphone | 4 | Marshall MX AC404 | Inside the Vehicle |
| Accelerometer (3-axis) | 1 | HTC Rezound | Inside the Vehicle |
| Gyroscope (1-axis) | 1 | HTC Rezound | Inside the Vehicle |

Additionally, referring back to FIG. 1, the system includes a video acquisition and processing module comprised of a high-resolution camera array and an audio data collection and processing module comprised of a microphone array to collect sensory data from other cars, and other sensors such as accelerometer and gyroscope to monitor the status of the driver's own car and make a final decision for lane change, e.g., through data-fusion.

Specifically, in this case, digital cameras with built-in stereo microphones were mounted on all 4 sides of vehicle 16, e.g., along its external periphery (in a linear axis), to capture images of the wheels and the tail lights of adjacent vehicles and any noise from these vehicles in adjacent lanes. In addition, universal-microphones (not directional microphones) were mounted on the inside and outside of the car to record sounds from these environments. Also, the system included a 3-axis accelerometer to provide linear acceleration data in the x, y and z axes, and a t-axis gyroscope capable of measuring angular motion about the z-axis (vertical axis) of vehicle 16.

For example, the system may include low-cost webcams, low-cost universal serial bus (USB) microphones and a smartphone with built-in accelerometer and gyroscope.

Sensor Fusion

Experimental Procedures and Results:

The following are experimental procedures and results of the present methodology using audio-video clips and other sensory data collected over several months.

Video Processing

Camera Calibration

In lieu of a depth sensor, a camera calibration technique was used to determine if objects detected in an image are in a next lane (in the immediate proximity of vehicle 16), lanes further beyond, or over the horizon. In an aspect, since the cameras may be mounted such that they are pointed at an angle towards the road, the image-frame captured by a camera may be divided into 3 horizontal strips of almost same height. In this case, the lowest section of the image represents an immediate 6 foot ("ft.") of distance from vehicle 16 (along the camera axis), the middle section an area from 6 to 12 ft. away, and the top section of the image an area beyond 12 ft. along the camera axis.

Figure 4:
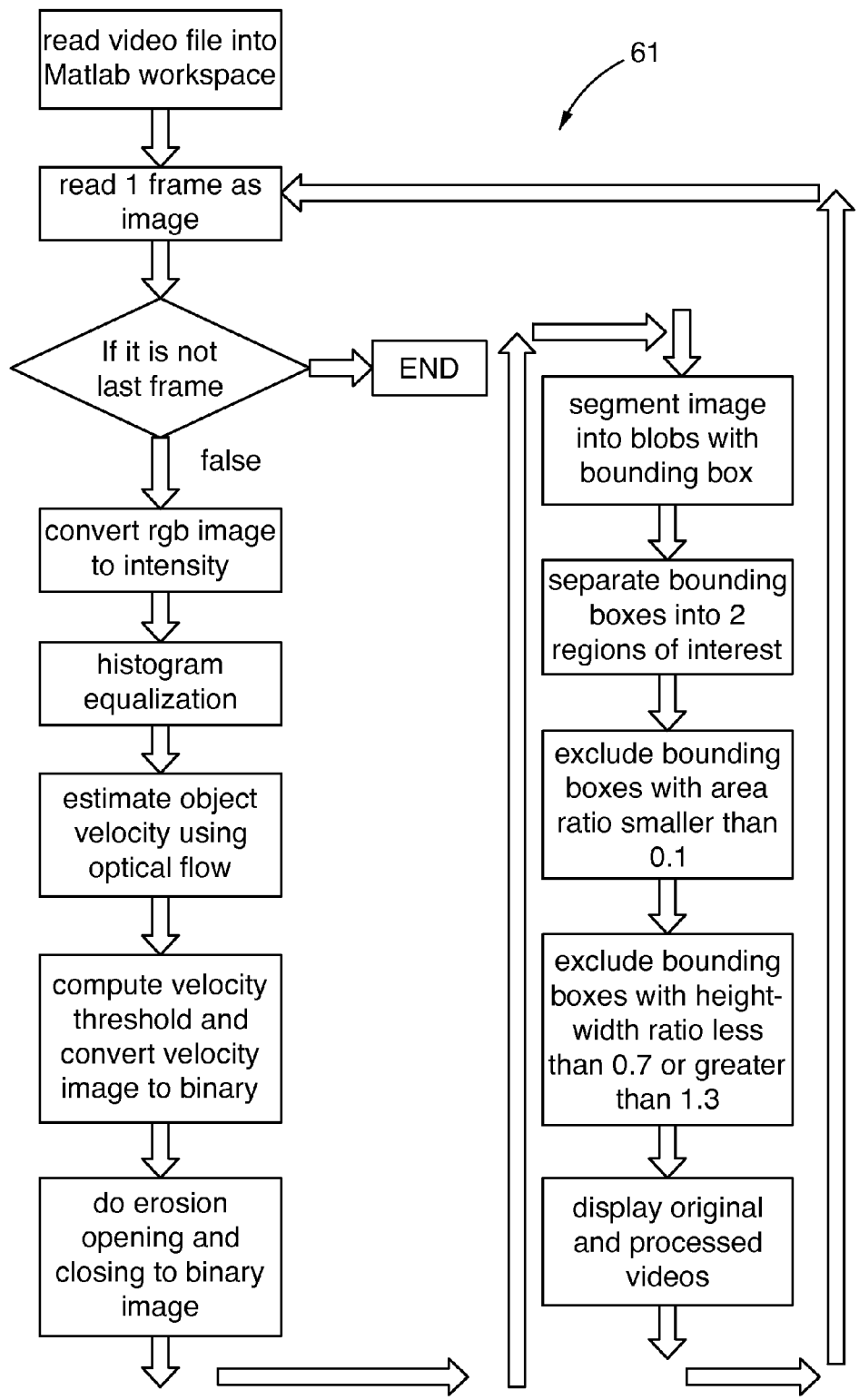
FIG. 4 is a flowchart of an aspect of a method of video processing.

Referring to FIG. 4, one aspect of a video processing methodology 60 includes the following steps:

Estimating the Velocity Image

Individual frames are extracted from live video recorded by each camera. Each frame is comprised of an RGB color image. The RGB image is first converted to gray scale intensity values in the range of [0, 255]:

$$I(x,y,t)=R2+G2+B2$$

Histogram equalization is then performed on the gray scale image for contrast enhancement, and the Horn and Schunck Optical Flow algorithm is used to estimate the velocity vector $V=(Vx,Vy)$ by calculating the motion between two image frames at times t and t+$\Delta$t at every pixel, assuming that an object at location (x,y,t) with intensity I(x,y,t) moves by $\Delta$x, $\Delta$y and $\Delta$t between the two image frames and that the object's brightness stays constant. In other words:

$$I(x,y,t)=I(x+\Delta x, y+\Delta y, t+\Delta t)$$

Using Taylor series expansion, the result is:

$$(dI/dx)Vx+(dI/dy)Vy=-(dI/dt)$$

which is an equation with two unknowns (Vx,Vy). The Horn-Schunck method is used to introduce another constraint, which involves a global smoothness assumption in the flow-field over the whole image. This method minimizes distortions in flow, while searching for solutions which show more smoothness.

Motion vectors are created based on the estimated velocity of each pixel using the optical flow algorithm. The length and direction of the vector describes the magnitude and direction of motion at each pixel.

Image Segmentation and Morphological Processing

A threshold is adaptively selected to convert the velocity image to a binary image. This is achieved by calculating the mean of the velocities from all previous frames, and computing a histogram for each frame with modes corresponding to background velocities (same as that of the driver's vehicle but in the opposite direction), other vehicles moving in the same direction and the opposite direction. The mean value is used as a threshold to create the binary image.

Morphological operations, otherwise referred to as error correction or noise cancellation, such as erosion, opening, and closing, are then applied, along with a 5×5 median filter, to remove visual "noise". Erosion peels off one layer of a blob. Opening separates blobs which are barely connected. Closing fills in small gaps inside a blob.

Image segmentation is then performed as follows:
(1) segmenting the entire image into multiple blobs and judging each blob as either a vehicle feature or not, and
(2) using a blob analysis system object, e.g. such as in the MATLAB program, to perform segmentation and return the parameters of each blob, then fitting a bounding box to it.

Then, the blobs are separated into three regions of interest, using the camera calibration information described above. The upper region of the image frame is treated as the scene background and/or the farthest lanes, and in an aspect, the blobs in that region may be ignored. The lower and middle regions are treated as the adjacent lane and the lane after that, respectively.

Since the lowest region corresponds to the next lane (from vehicle 16), the bounding boxes in those regions are marked with a bright visible color (usually "Red" or "Green"), which may be provided to the driver with driver assist indication 22, e.g. as driver assistance information, to alert the driver about the presence of objects in the next lane.

The bounding boxes in the next region are colored "Yellow" as a cautionary signal to the driver about the presence of objects slightly farther away from vehicle 16, e.g., at a distance that may be considered a relatively safe distance to allow for performance of driving action 24.

Feature Extraction

Figure 5:
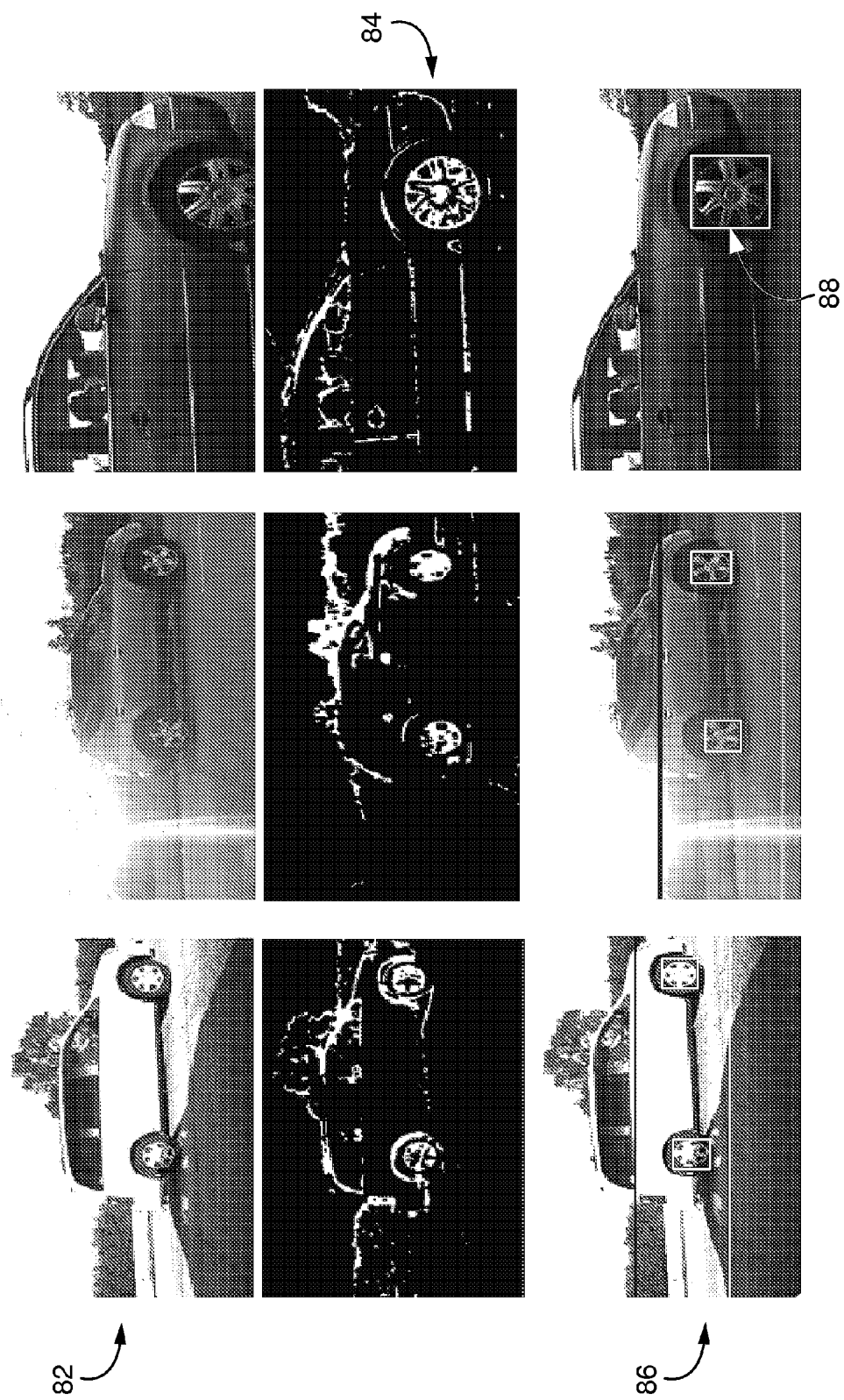
FIG. 5 is a lateral view from a camera of the present system detecting a moving object, e.g. in a lane change scenario under different lighting conditions; at Top: Original color images of cars on various lanes on the highway; at Middle: Binary images after the computation of motion vectors using optical flow, morphological analysis and thresholding; and at Bottom: Original image frames overlaid with colored bounding boxes around the wheels, as detected in the feature extraction process through image segmentation and blob analysis.

Referring to FIG. 5, a series of images 82 includes original images 84, binary images after processing 86, and original images overlaid with bounding boxes 88 resulting from the present method. The system uses these images to detect moving vehicles from a lateral view where the image of the vehicle in the next lane is often larger than the image frame captured by a camera, in an aspect, wheels and tail-lights may be selected as primary features (and other circular arcs on a vehicle or inside the vehicle may be utilized as secondary features). For example, wheels may be selected because their shape and color are universal among vehicles, and tail-lights because they are illuminated at night, when darkness makes it difficult to recognize wheels.

In any case, the bounding box 88 is drawn directly on the area surrounding the blob, which is shown in "white" on the images of wheels detected by the present algorithms in the lower section in FIG. 5. Although not illustrated, there may also be bounding boxes around the bright red tail-lights detected by the present technique.

Audio Processing

Based on initial experiments with audio signals recorded by microphones mounted on our car while moving on the highways, it was found that:
(1) wind and engine noise recorded from both sides of the vehicle were highly correlated but noise caused by any vehicle passing by on next lane generally led to an uncorrelated signal; and
(2) the wind and engine noise were recorded as flat wide-band signals on the audio spectrograms, but noise due to a vehicle moving in the next lane appeared as a narrow-band signal of low frequency.

Figure 6:
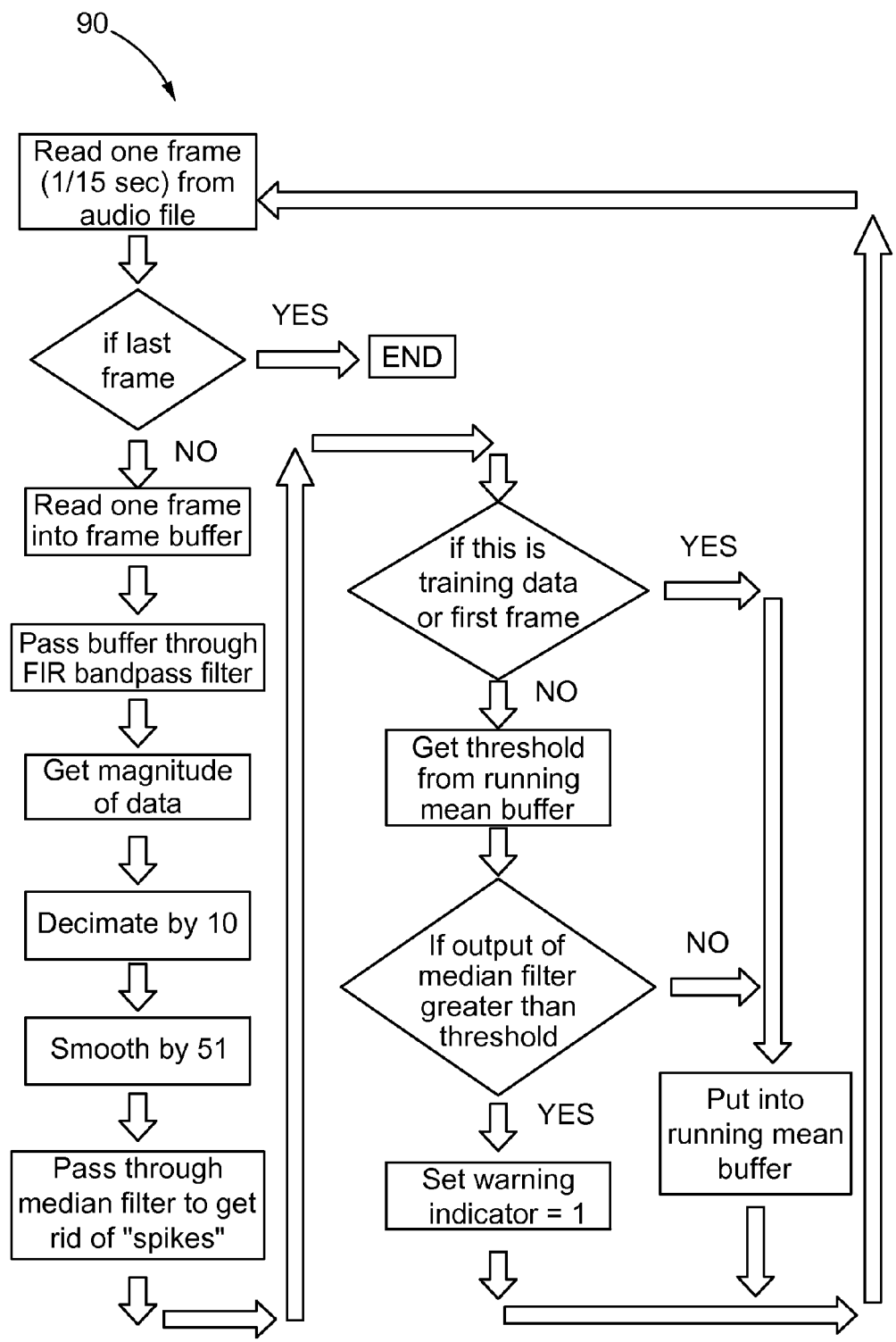
FIG. 6 is a flowchart of an aspect of a method of audio processing.

Referring to FIG. 6, based on these initial observations, the present apparatus and methods utilize an audio processing methodology as described below.

Time Domain Analysis of Recorded Data

The time-domain analysis uses a discrete-time FIR (Finite Impulse Response) filter, such that its output is a weighted sum of the current input value and a finite number of previous values of the input, as described below with the output sequence y[n] in terms of its input sequence x[n]:

$$y[n] = b_0 x[n] + b_1 x[n-1] + \ldots + b_N x[n-N]$$

$$= \sum_{i=0}^{N} b_i x[n-i]$$

where x[n] is the input signal, y[n] is the output signal, and $b_i$ are the filter coefficients for an Nth order filter.

Figure 7C:
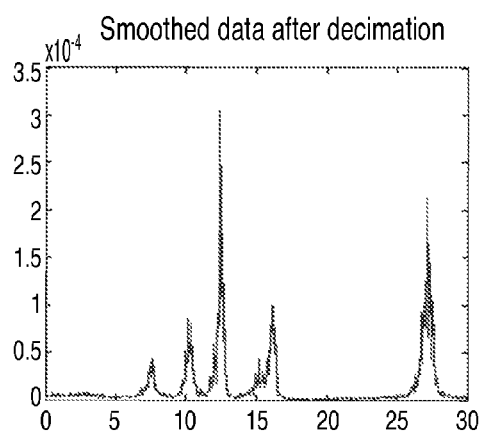
Figure 7D:
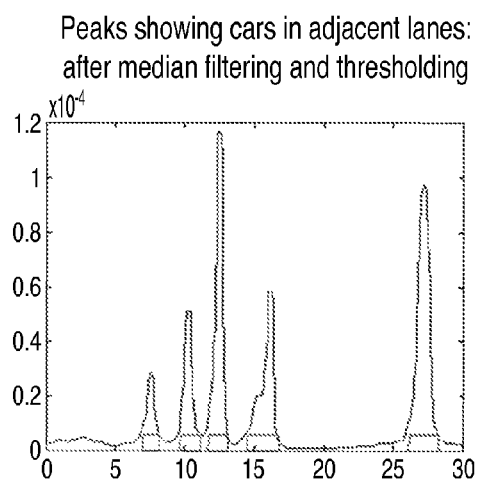
Figure 8B:
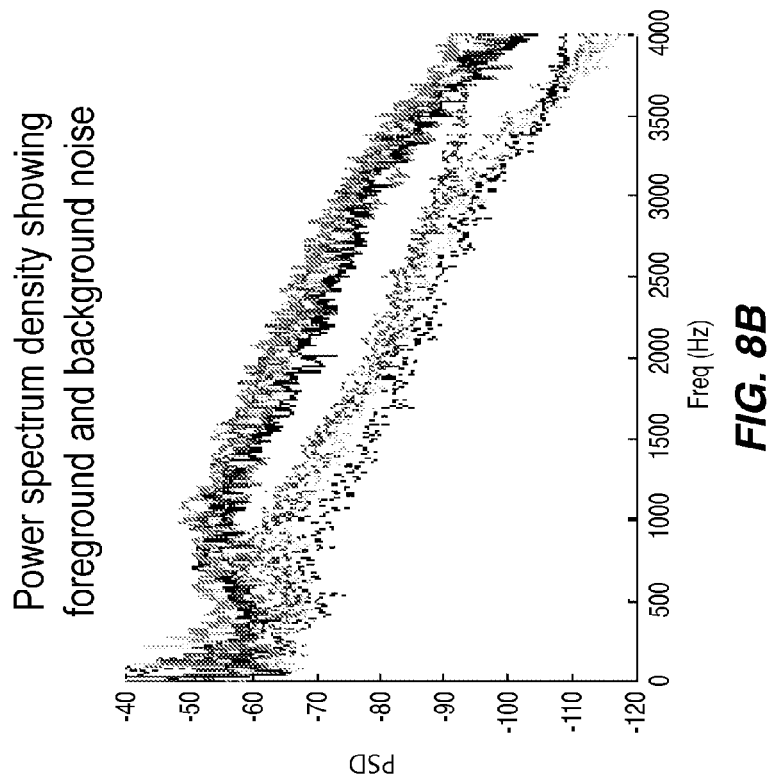
FIGS. 8A-8D are series of graphs of an aspect of frequency domain analysis of recorded audio signals.
Figure 8A:
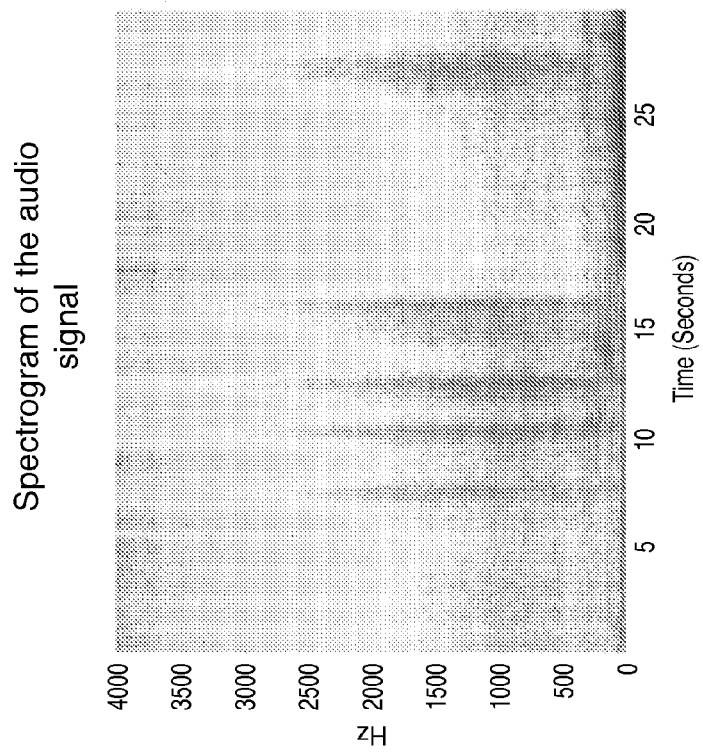
Figure 8D:
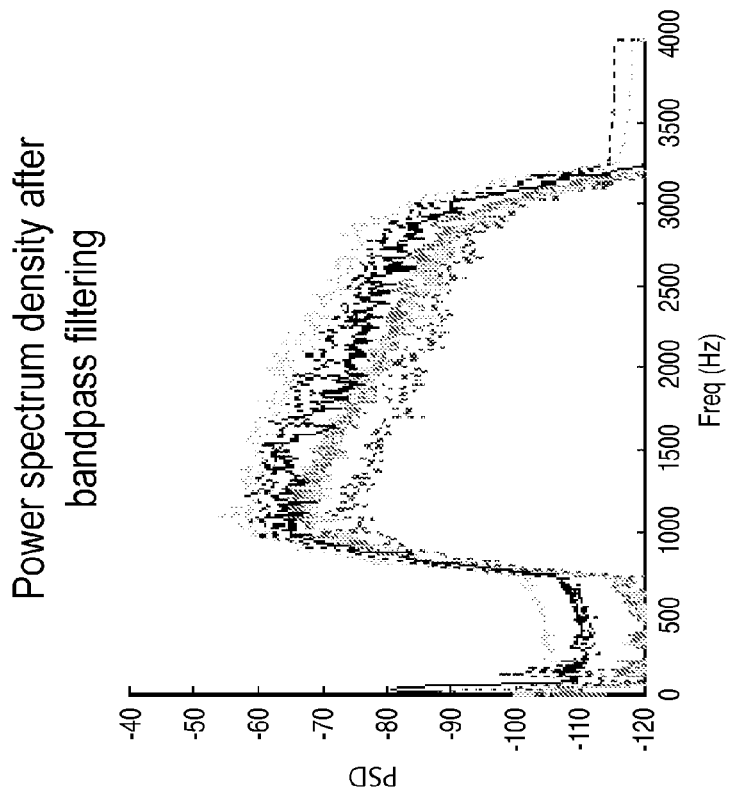
Figure 8C:
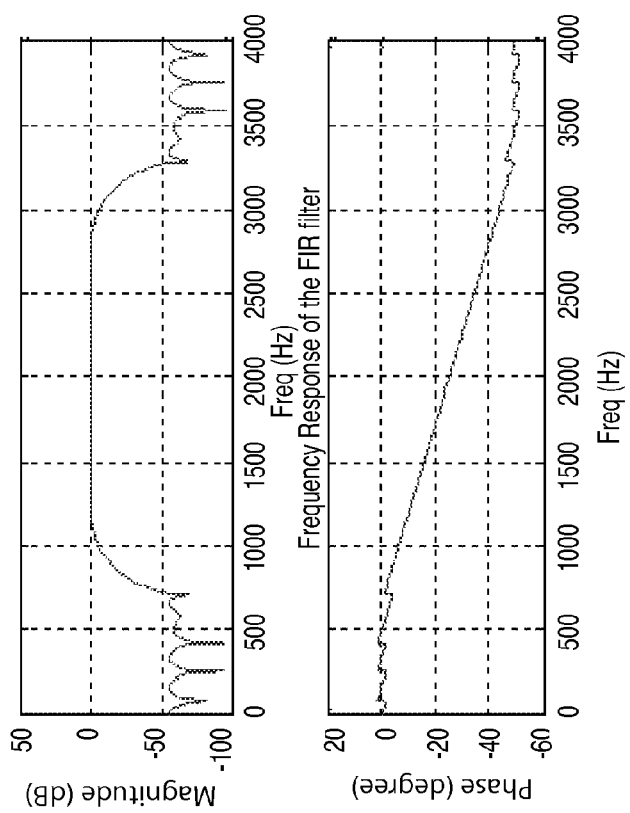
Figure 9B:
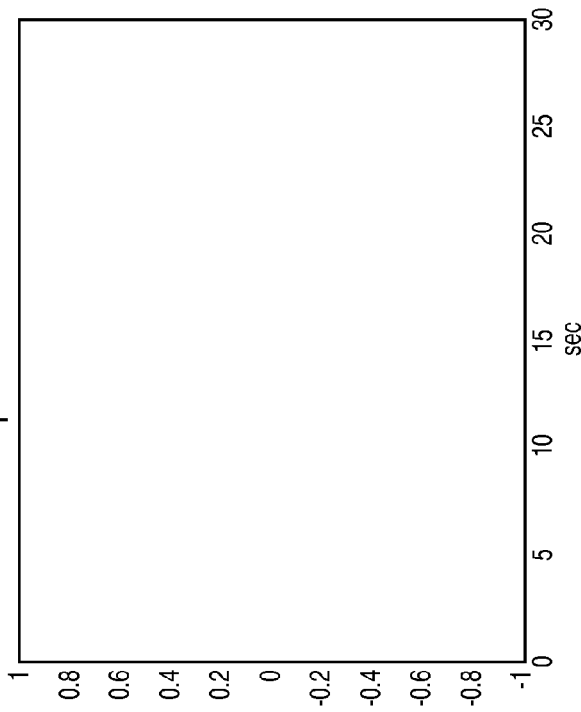
FIGS. 9A-9F are series of graphs of an aspect of analysis of saturated data, with poor signal-to-noise ratio.
Figure 9A:
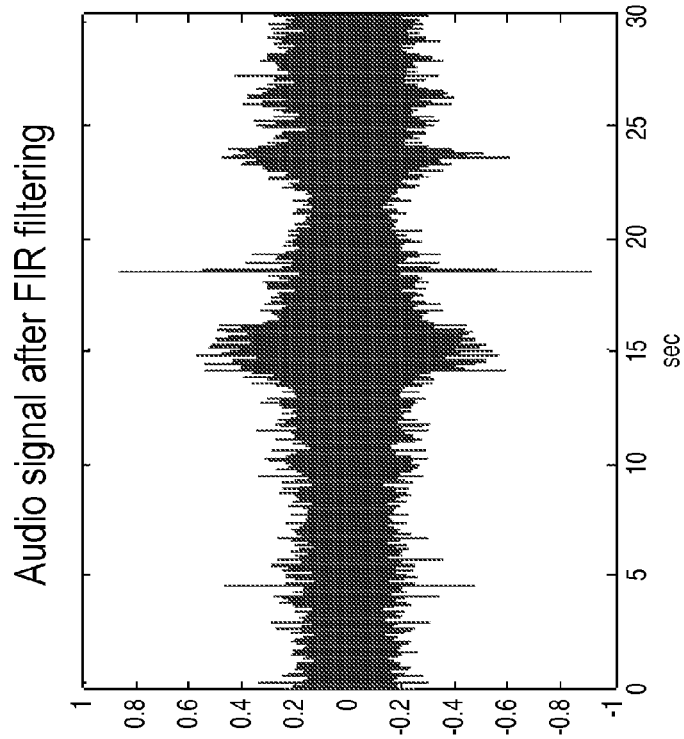
Figure 9D:
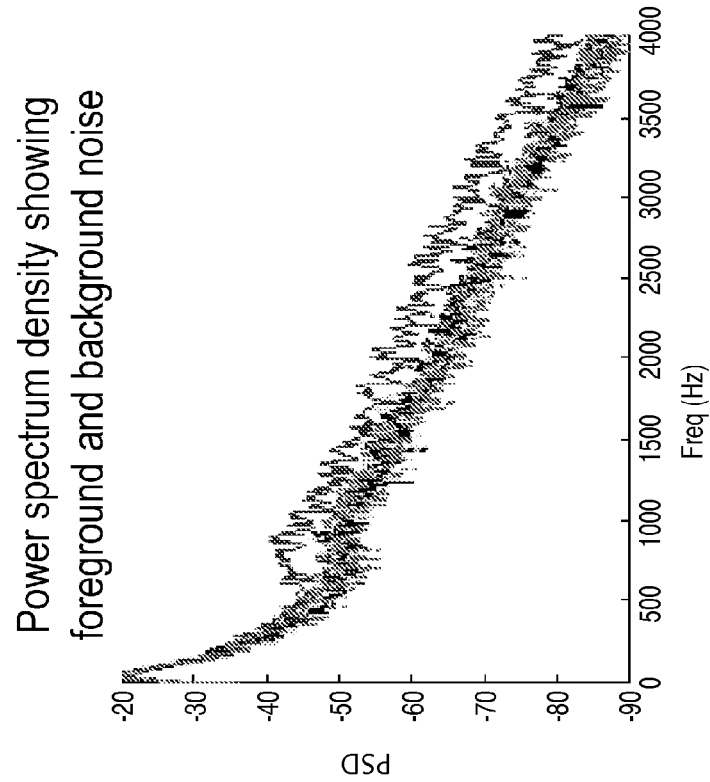
Figure 9C:
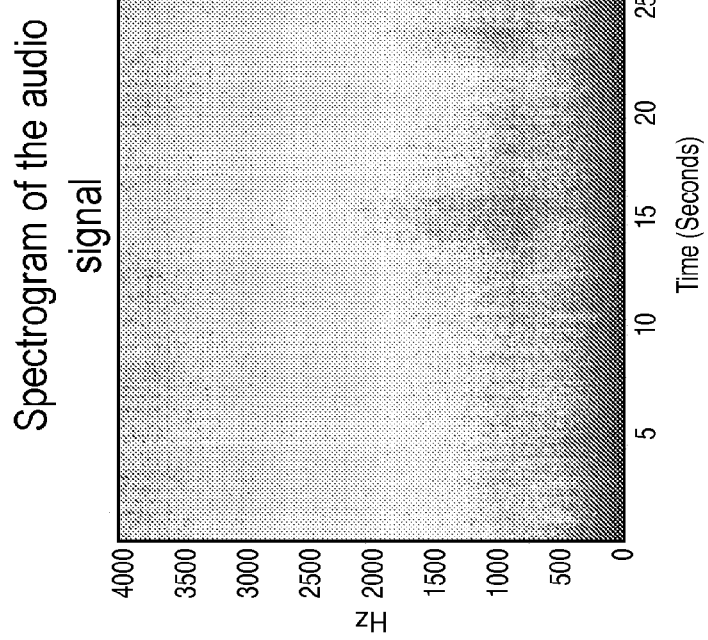
Figure 9F:
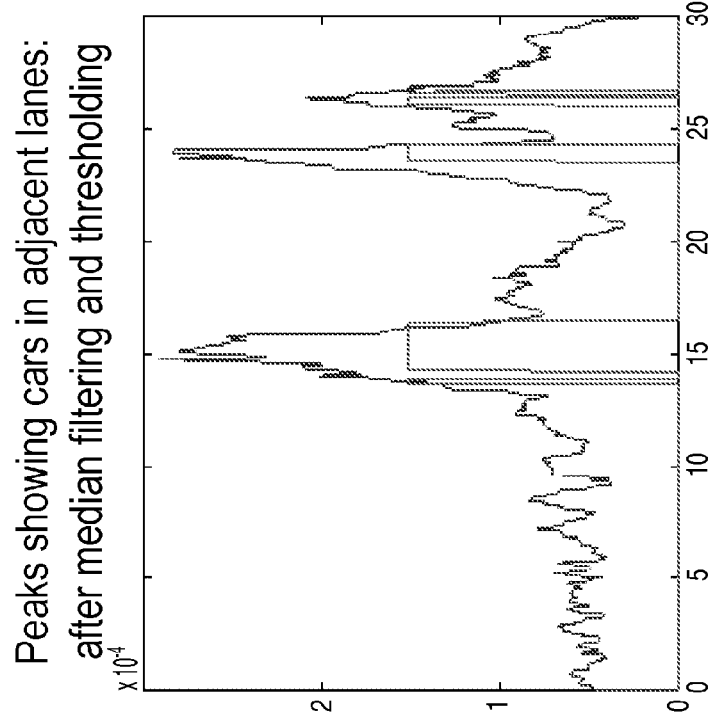
Figure 9E:
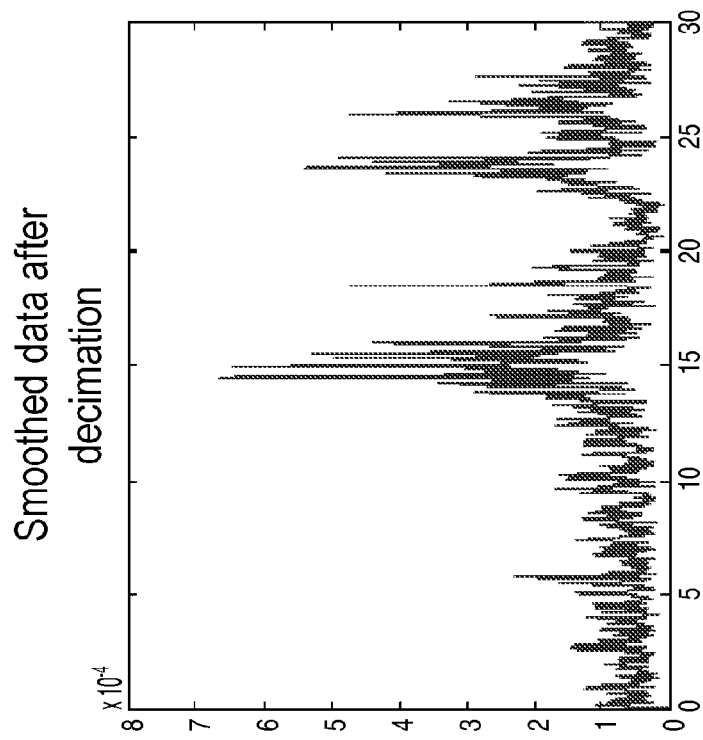
Figure 10A:
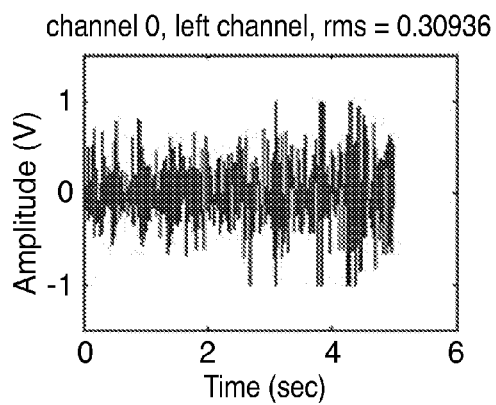
FIGS. 10A-10D and 11A-11D are respective series of graphs of analysis of external audio signals for source localization and tracking.
Figure 10B:
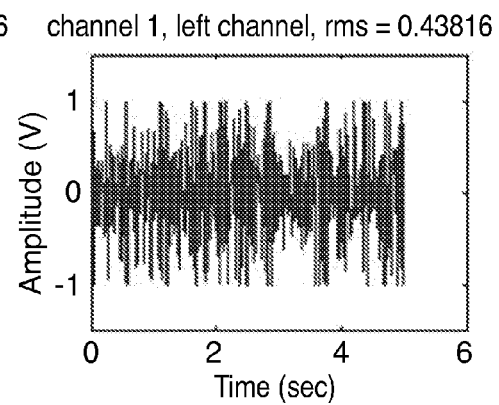
Figure 10C:
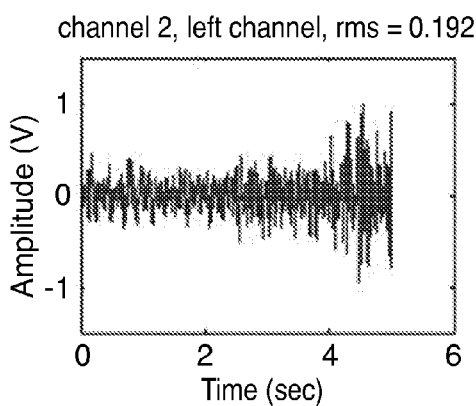
Figure 10D:
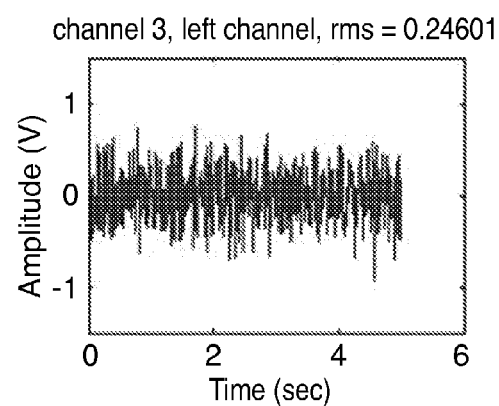

Referring to FIGS. 7A-7D, for example, a result of the time domain analysis is represented in the series of graphs. In FIG. 7A: Original audio signal with poor signal-to-noise ratio. In FIG. 7A, it is difficult to distinguish signal peaks corresponding to other cars in motion. Further, In FIG. 7B: Audio signal after FIR band-pass filtering. In FIG. 7B, several peaks can be observed corresponding to vehicles in motion in adjacent lanes. In FIG. 7C: Audio profile of signal magnitude after smoothing and decimation. In FIG. 7C, some narrow "spikes" are still evident, which might cause misidentification. Finally, In FIG. 7D: Audio profile after median filtering to remove noise spikes and background thresholding through gradual learning (the bottom line, in red) to remove background noise. FIG. 7D clearly shows presence of other vehicles in the next lane(s).

Frequency Domain Analysis

For the frequency-domain analysis, audio spectrograms were based on STFT (Short-Time Fourier Transform) as expressed as:

$$STFT\{x[n]\}(m, \omega) \equiv X(m, \omega)$$

$$= \sum_{n=-\infty}^{\infty} x[n]w[n-m]e^{-j\omega n}$$

with signal x[n] and window function w[n]. In this case, m is discrete and w is continuous which yields its spectrogram function:

$$\text{spectrogram}\{x(t)\}(\tau,\omega) = |X(\tau,\omega)|^2$$

Referring to FIGS. 8A-8D, a series of graphs depict the results of the Frequency Domain Analysis of Recorded Audio Signals. For example, in FIG. 8A: Spectrogram of the original audio signal using STFT and variation in power spectrum density over time. High power spectrum area (between 500 Hz to 3000 Hz corresponding to peaks at 7, 10, 12, 15 and 27 sec in the spectrogram) indicate likely presence of vehicles. Low-frequency power below 100 Hz (between 20 to 30 sec) makes it hard to detect peaks in the audio time series. Further, FIG. 8B: 1-D power spectrum of the audio signal. Foreground signal and background noise form two separate groups, the lower group representing the surrounding engine noise and wind noise, and the higher group representing moving vehicles; both groups overlap at low frequencies (<1000 Hz) and have low signal strength at high (>3000 Hz) frequencies. Also, in FIG. 8C: Frequency response of FIR filter (a band-pass filter with cutoff frequencies at 1000 Hz and 3000 Hz)— implemented in time-domain using convolution operation with a rectangular window function. Additionally in FIG. 8D: Power spectrum after FIR band-pass filtering, delineating the separation between the signal groups due to cars and road-noise.

Referring to FIG. 9A-9F, in addition, the methodology involves analysis of saturated (e.g., with poor signal-to-noise ratio) audio signals recorded by the USB microphones. In particular, the figures illustrate time and frequency domain analyses of noisy and completely saturated audio signals. The signal processing methodology with FIR band-pass filter (based on spectrogram and Short-Time Fourier Transform) reveals three clear peaks showing the presence of three vehicles in the next lane(s).

Source Localization and Tracking

Besides the frequency domain and time domain analyses using Short-Time Fourier Transform and FIR-based band-pass filtering, the present aspects also analyzed the data collected by the microphones in various conditions and analyzed the RMS values of the signal-intensities for audio source localization.

Scene 1 (Using External Microphones)

Figures 11A, 11B:
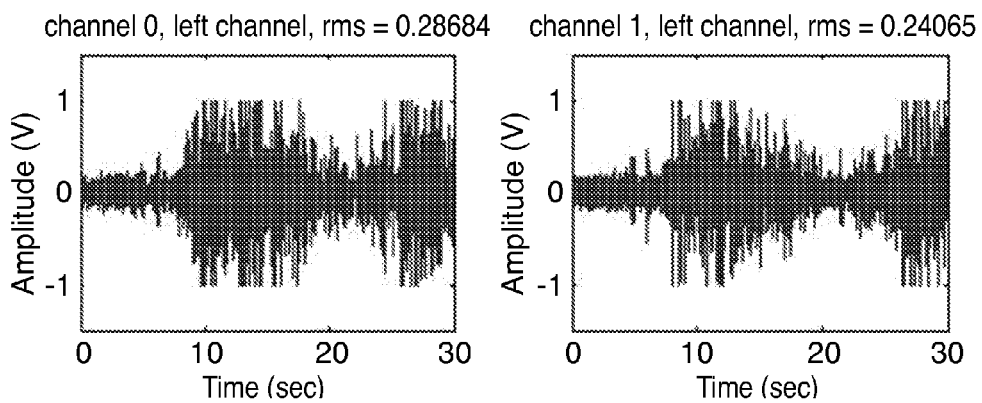
Figures 11C, 11D:
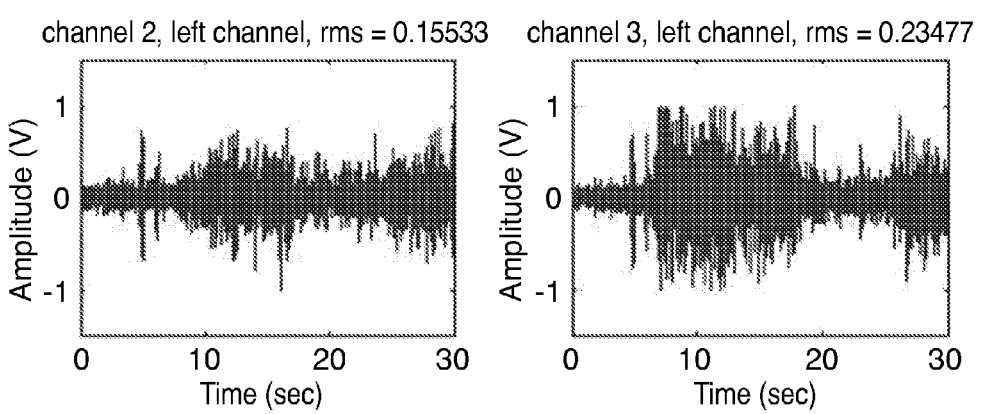

Referring to FIGS. 10 and 11, in these cases, the USB microphones were placed in linear arrays (2 in each array) along each side of the car to acquire audio signals from passing cars in next lanes. Channel 0 corresponds to the microphone in the driver's side of the vehicle in front, channel 1 corresponds to the microphone in the passenger's side in front, Channel 2 corresponds to the microphone in the driver's side towards the rear, and channel 3 corresponds to the microphone in the passenger's side towards the rear. Specifically, in FIG. 10, the test vehicle was moving on a 4-lane road (at 30 mph) with a large delivery truck on front-right in the next lane causing high root mean square (RMS) value for channel 1. In FIG. 11, both the test vehicle and the truck are making a left turn at an intersection, where the truck stays in the front-right of the test vehicle in the next lane, causing high RMS values for recorded signals for channel 0, 1 and 3, but a much smaller RMS value for channel 2.

Scene 2 (Using Internal Microphones)

Referring to FIG. 12, in this case, the 4 USB microphones were placed in linear arrays (2 in each array—one array in the front dash-board of the vehicle and the other array behind the rear-passengers) to record audio signals from conversations taking place inside the vehicle. In this case, Channel 0 corresponds to the microphone in the driver's side of the vehicle on the front-dashboard, channel 1 to the microphone in the passenger's side on the front-dashboard, Channel 2 to the microphone in the driver's side near the rear windshield, and channel 3 to the microphone in the passenger's side towards the rear windshield. In particular, this example of source localization with microphones inside the vehicle illustrates signals corresponding to a distracted driver engaged in a conversation with a passenger in the front, while driving the car (as evidenced by high RMS values of the recorded signals from channels 0 and 1, and low values from channels 2 and 3).

Processing of Accelerometer and Gyroscope Data

In the present use case, also collected and analyzed were movement-related information, e.g. accelerometer and gyroscope data, to monitor the linear acceleration and the angular rotation of the vehicle before, during and after the lane-change process.

Referring to FIG. 13, graphs represent recorded data from the accelerometer in x and y (ACCx and ACCy) and the gyroscope (THETAz) during several successive lane changes by the driver in a time-window of about 65 secs. Here, the x axis for the accelerometer is along the direction of travel along the highway, the y-axis represents its orthogonal direction in the same plane, and the z axis represents the vertical axis, normal to the plane of the road. In this example, the y-axis for these charts is in $ft/sec^2$ for the accelerometer and in degrees for the gyroscope; the x-axis is in seconds. As such, the methodology may analyze the peak values over a given time period, which may be compared to a threshold, to determine if the driver is driving erratically and/or to determine the road conditions, both of which may affect a decision as to whether or not it is safe to perform driving action 24.

Final Decision

Results from all sensor types are combined to issue a final "Go/No Go" signal to the driver, as illustrated below in Table 2.

TABLE 2

| Go/No-Go Final Decision | | | | |
|---|---|---|---|---|
| Audio A | Video V | Accel AC | Gyro G | Final Decision F |
| 1 | * | * | * | 0 |
| 0 | 1 | * | * | 0 |
| 0 | 0 | 1 | * | 0 |
| 0 | 0 | 0 | 1 | 0 |
| 0 | 0 | 0 | 0 | 1 |

On the left, 0 = Clear, 1 = Not Clear
On the Right, 0 = No-Go, 1 = Go
(In essence, F = 1 if A = 0, V = 0, AC = 0 and G = 0)

In an aspect, the operation of driver assist system 10 may start with the driver activating his turn signal. Immediately, the accelerometer and gyroscope sensors are read, e.g. to obtain movement-related information 36 and/or historical movement-related information 42 for analysis by movement-related processing engine 48 and/or final decision making engine, to make sure the driver has been driving non-erratically for the last 60 seconds (to confirm the driver is capable of doing the lane change). Then the external microphone array initiates a check to determine if there are any vehicles in the vicinity, e.g. via collecting audio information 28. If one is detected based on analysis of audio information 28 by audio processing engine 44 and/or final decision making engine 22, then final decision making engine 22 gives a "No Go" signal, e.g. driver assist indication 22 having a negative value, and the driver is notified that it is not safe to make the lane change. If audio processing engine 44 and/or final decision making engine 22 does not detect such a vehicle based on audio information 28, then the camera array obtains video information 32 for analysis by video processing engine 46 and/or final decision making engine 22 to analyze the surroundings for the presence of vehicles in the next lane and the one after, and/or to determine the gap for the vehicle to move into and ensure that nothing is in the way. In an aspect, the analyzed gap can be configured to be large enough to allow vehicle 16 to enter the lane without disrupting the flow of traffic, such that other vehicles should not have to slow down, speed up, or change lanes because this car just entered their lane.

As such, once both the vision (or video) and audio systems have determined that there is ample room for vehicle 16 to enter a new lane, driver assist system 10 gives a "Go" signal to the driver to signal that it is safe to change lanes. During this process, in an aspect, the accelerometer and gyroscope sensors may monitor whether the driver is turning the wheel abruptly or sharply, or accelerating erratically and provide additional driver assist indications to the driver to help with the driving action.

In a further aspect, driver assist system 10 can make sure the driver does not make a lane change at a traffic intersection (even though there is no vehicle in the next lane). For example, in this case, driver assist system 10 may utilize video/vision capabilities to recognizing a traffic intersection, e.g., with or without a stop light.

Other results and observations are as follows:

Frequency of detection of wheels and/or tail-lights in motion using video processing module only: 80.2%.

Frequency of detection of cars in next lane using audio processing engine only (with FIR filter): 63.9%.

False Detection Rate: 8.6%

Overall Detection Rate (Sensor Fusion): 92.8% (measured using a total of 380 audio and video clips of 30 seconds each with video frame rate of 15 frames per second).

CONCLUSION

For many people, driving represents freedom of movement. However, complex skills are required to make correct judgments on the road. The above use case has focused on the lane change problem in driving. Successful lane-change includes not only knowledge about the presence of vehicles in the adjacent lanes, but also information about vehicles which may lie immediately ahead of or behind the blind spot, and vehicles in the lane after next. All these neighboring vehicles pose a potential hazard to the vehicle which is about to make a lane change attempt. Clearly, the more vehicles are present in and around the blind-spot in the next two lanes (traffic-density), the more are the chances of an accident. The problem is further complicated by the fact that it involves a very dynamic situation where each vehicle can independently change its velocity, acceleration and direction of motion without any prior warning, and one or more vehicles may end up converging to the same spot in the next lane at the same time.

Ideally, a lane change assistance system should monitor all these situations and should require very little learning on the driver's part to be able to operate it effectively. Its primary function is to provide streamlined information to the driver, and in some aspect may operate when the driver has activated the turn signal, indicating his intention to change lanes.

To solve this problem, the present system detects and monitors the motion of vehicles in the immediate proximity of the subject vehicle using primarily a camera and a microphone array, and other secondary sensors including an accelerometer and a gyroscope.

As a part of this study, the above-noted use case was based on collected live audio and video clips on different road conditions, traffic conditions and lighting conditions. In general, the data confirmed the validity of the present technique. The audio processing algorithms for intensity based source localization worked quite well at low-speeds (<50 mph), but at a high speed, the microphones often got saturated due to wind and engine noise. But by passing these signals through FIR bandpass filters (and analyzing the spectrograms using Short-Time Fourier Transform), the present methodology removes background noise while the vehicle was moving at a high speed.

The video processing algorithm based on Horn and Schunck's optical flow technique also worked well in terms of detecting the brighter wheels (with dark tires around them), or the red tail-lights of vehicles at different times of the day.

Moreover, in the above use case, longer-range sensing was performed using camera calibration to detect spatial features on the lanes after next (e.g., beyond the nearest lane), which also pose an indirect threat to the driver. In some aspects, a configuration may include one camera pointed directly at the blind-zone (facing laterally outwards) and two cameras pointed at the regions immediately ahead or behind the vehicle to look for other vehicles that are likely to approach the blind-zone by speeding up or slowing down from their current locations.

In general, the accelerometer and gyroscope data were sufficient for accurate detection of correct lane change, or to detect whether the vehicle is swerving frequently or weaving between lanes. In this case the system issued a "No Go" signal to the driver.

It should be pointed out in this context that even though each of the computer vision and signal processing sensing systems and algorithms, and also the other sensor types used here had their own deficiencies, when aggregated using a rule-based processing hierarchy, the combined output produced excellent results with a high degree of accuracy.

In overall analysis, the above use case validated the effectiveness of driver assist system 10 including a sensor-fusion technique emulating human perception. Using these sensors, driver assist system 10 can also detect if the driver is distracted, weaving in and out of lanes, or otherwise driving erratically, and accordingly alert the driver.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of providing driver assistance for performing a driving action, comprising:
    obtaining video information adjacent to a vehicle;
    obtaining audio information adjacent to the vehicle; and
    generating, via a decision making processor executing one or more decision algorithms, a driver assist indication based on a combination of the video information and the audio information, the generating comprising:
        comparing the video information to a video threshold corresponding to video information for which performing the driving action is acceptable;
        comparing the audio information to an audio threshold corresponding to audio information for which performing the driving action is acceptable; and
        generating the driver assist indication with a positive value or a negative value based on a result of the comparing.

2. The method of claim 1, further comprising:
    obtaining vehicle movement-related information; and
    wherein generating the driver assist indication is further based on the vehicle movement-related information.

3. The method of claim 2, wherein generating the driver assist indication further comprises:
    comparing the obtained vehicle movement-related information to a movement-related threshold corresponding to movement information for which performing the driving action is acceptable.

4. The method of claim 3, wherein generating the driver assist indication further comprises generating the driver assist indication with the negative value when at least one of the obtained video information, the obtained audio information, or the obtained vehicle movement-related information is less than a respective one of the video threshold, the audio threshold, or the movement threshold.

5. The method of claim 1, wherein:
    obtaining the audio information further comprises obtaining the audio information from inside of the vehicle; and
    generating the driver assist indication is further based on the audio information obtained from the inside of the vehicle.

6. The method of claim 1, further comprising:
    estimating a velocity of an object based on the obtained video information;
    canceling noise from the obtained video information to define noise-canceled video information;
    extracting features from the noise-canceled video information; and
    determining whether the extracted features identify that the object is a vehicle.

7. The method of claim 1, further comprising:
    performing time domain analysis of the obtained audio information;
    performing frequency domain analysis of the obtained audio information;
    analyzing signal intensities in the obtained audio information based on at least one of the time domain analysis and the frequency domain analysis; and determining whether the signal intensities identify a vehicle.

8. The method of claim 1, further comprising:
receiving notification of an intended driving action; and
wherein obtaining the video information, obtaining the audio information, and generating the driver assist indication is in response to the notification of the intended driving action.

9. A computer program product comprising:
a non-transitory computer-readable medium having control logic stored therein, the control logic comprising:
   at least one instruction for causing a computer to obtain video information adjacent to a vehicle;
   at least one instruction for causing the computer to obtain audio information adjacent to the vehicle; and
   at least one instruction for causing the computer to generate a driver assist indication based on a combination of the video information and the audio information,
   wherein the at least one instruction for causing the computer to generate a driver assist indication is further for causing the computer to:
      compare the video information to a video threshold corresponding to video information for which performing a driving action is acceptable;
      compare the audio information to an audio threshold corresponding to audio information for which performing the driving action is acceptable; and
      generate the driver assist indication with a positive value or a negative value based on a result of each comparison.

10. The computer program product of claim 9, wherein the control logic further comprises:
at least one instruction for causing the computer to obtain vehicle movement-related information; and
wherein the at least one instruction for causing the computer to generate the driver assist indication is further based on the vehicle movement-related information.

11. An apparatus to provide driver assistance for performing a driving action, comprising:
a video processor configured to obtain video information adjacent to a vehicle;
an audio processor configured to obtain audio information adjacent to the vehicle; and
a decision making processor to generate a driver assist indication based on a combination of the video information and the audio information, the decision making processor being configured to:
   compare the video information to a video threshold corresponding to video information for which performing the driving action is acceptable;
   compare the audio information to an audio threshold corresponding to audio information for which performing the driving action is acceptable; and
   generate the driver assist indication with a positive value or a negative value based on a result of each comparison.

12. The apparatus of claim 11, further comprising:
a movement-related processor configured to obtain a vehicle movement-related information; and
wherein the decision making processor is further configured to generate the driver assist indication based on the vehicle movement-related information.

13. The apparatus of claim 12, wherein the decision making processor is further configured to:
compare the vehicle movement-related information to a movement-related threshold corresponding to movement information for which performing the driving action is acceptable.

14. The apparatus of claim 13, wherein the decision making processor is further configured to generate the driver assist indication with the negative value when at least one of the obtained video information, the obtained audio information, or the obtained vehicle movement-related information is less than a respective one of the video threshold, the audio threshold, or the movement threshold.

15. The apparatus of claim 11, wherein the audio processor configured to obtain the audio information from inside of the vehicle, wherein the decision making processor is further configured to generate the driver assist indication based on the obtained audio information from the inside of the vehicle.

16. The apparatus of claim 11, wherein the video processor comprises a video processing algorithm configured to:
estimate a velocity of an object based on the obtained video information;
cancel noise from the obtained video information to define noise-canceled video information;
extract features from the noise-canceled video information; and
determine whether the extracted features identify that the object is a vehicle.

17. The apparatus of claim 11, wherein the audio processor comprises an audio processing algorithm configured to:
perform time domain analysis of the obtained audio information;
perform frequency domain analysis of the obtained audio information;
analyze signal intensities in the obtained audio information based on at least one of the time domain analysis and the frequency domain analysis; and
determine whether the signal intensities identify a vehicle.

18. The apparatus of claim 11, wherein the video processor is further configured to obtain the video information, the audio processor is further configured to obtain the audio information, and the decision making processor is further configured to generate the driver assist indication in response to a notification of an intended driving action.

* * * * *